(12) United States Patent
Fontanella (10) Patent No.: US 6,631,081 B2
(45) Date of Patent: Oct. 7, 2003

(54) CAPACITIVE HIGH VOLTAGE GENERATOR (76) Inventor: Luca Fontanella, Via per Cusago di Sotto, 4/213, 20090 Cusago (IT)

( * ) Notice: Subject to any disclaimer, the term of this patent is extended or adjusted under 35 U.S.C. 154(b) by 0 days.

(21) Appl. No.: 10/032,822

(22) Filed: Oct. 18, 2001

(65) Prior Publication Data

US 2002/0097028 A1 Jul. 25, 2002

(30) Foreign Application Priority Data

Oct. 20, 2000 (IT) ...................................... TO2000A0991

(51) Int. Cl.[7] .............................................. H02M 7/19
(52) U.S. Cl. ......................... 363/59; 307/109; 307/110
(58) Field of Search ..................... 363/59, 60; 307/109, 307/110

(56) References Cited

U.S. PATENT DOCUMENTS

| 4,581,546 A | * | 4/1986 | Allan ........................ 3327/536 |
| 4,733,108 A | * | 3/1988 | Truong ........................ 327/537 |
| 5,023,465 A | * | 6/1991 | Douglas et al. ............. 327/534 |
| 5,081,371 A | * | 1/1992 | Wong ......................... 323/314 |
| 6,288,601 B1 | * | 9/2001 | Tomishima ................. 327/536 |

* cited by examiner

*Primary Examiner*—Bao Q. Vu (57) ABSTRACT

A capacitive high voltage generator having a first stage and a second stage respectively formed by a first basic block and a second basic block and a third basic block. Each basic block has a timing input, a first supply input, a second supply input and an output terminal and includes: a buffer having a first terminal connected to the first supply input of the corresponding basic block, a second terminal connected to a ground terminal and an input terminal connected to the timing input of the corresponding basic block; a capacitor having a first terminal connected to an output terminal of the corresponding buffer and a second terminal connected, in a non-disconnectable way, to the output terminal of the corresponding basic block; a diode having a first terminal connected to the second supply input and a second terminal connected, in a non-disconnectable way, to the output terminal of the corresponding basic block. The output terminals of the first and second basic blocks are respectively connected to the first supply input and to the second supply input of the third basic block.

26 Claims, 4 Drawing Sheets

CAPACITIVE HIGH VOLTAGE GENERATOR

BACKGROUND OF THE INVENTION

1. Field of the Invention

The present invention relates to a capacitive high voltage generator.

2. Description of the Related Art

As is known, capacitive high voltage generators of the prior art exploit the many stages of which they are composed to supply voltages at outputs which are higher than the supply voltage.

Figure 1:
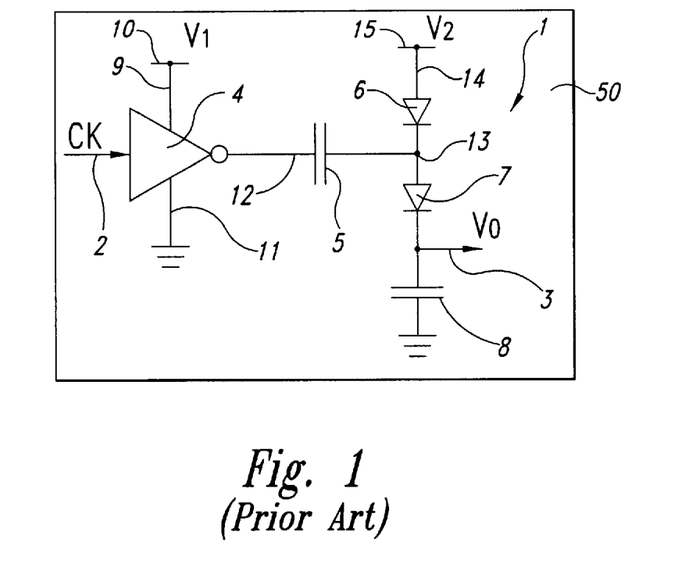
FIG. 1 shows a circuit diagram of a known single stage high voltage generator.

For simplicity's sake, FIG. 1 shows a capacitive single stage high voltage generator 50. The single stage 1 of the voltage generator 50 has an input terminal 2 receiving a timing signal CK and an output terminal 3 supplying an output voltage $V_O$.

Stage 1 comprises a buffer 4, of an inverting type, a boost capacitor 5, a first and a second diode 6, 7, and a filter capacitor 8. In detail, the buffer 4 has a first terminal 9 connected to a first supply line 10 set at a first reference potential $V_1$, a second terminal 11 connected to a ground terminal GND and an input terminal connected to an input terminal 2 of the stage 1. The boost capacitor 5 has a first terminal connected to an output terminal 12 of the buffer 4 and a second terminal connected to an intermediate node 13. The first diode 6 has an anode terminal 14 connected to a second supply line 15 set at a second potential $V_2$ and a cathode terminal connected to the intermediate node 13. The second diode 7 has an anode terminal connected to the intermediate node 13 and a cathode terminal connected to the output terminal 3 of the stage 1. The filter capacitor 8 has a first terminal connected to the output terminal 3 and a second terminal connected to the ground terminal GND.

When a higher output voltage is required, the high voltage generator 50 comprises several stages cascade-connected and structurally the same as stage 1 in FIG. 1. In particular, in the example shown in FIG. 2, the high voltage generator 50 comprises a first and a second stage $1_a$, $1_b$, the second stage $1_b$ having the anode terminal $14_b$, of the corresponding first diode $6_b$, directly connected to the output terminal $3_a$ of the first stage $1_a$.

Figure 2:
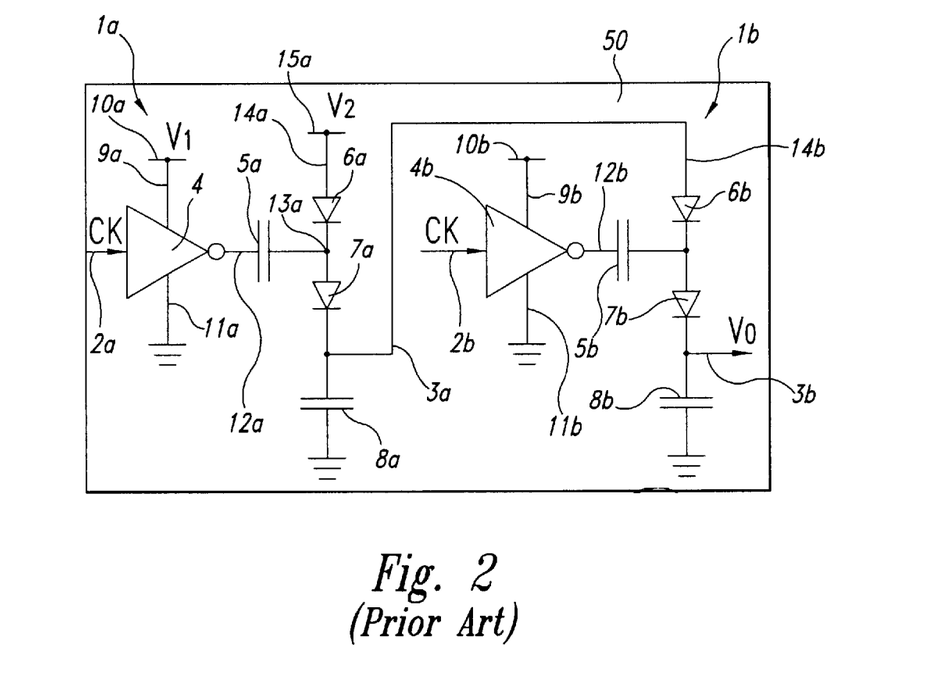
FIG. 2 shows a circuit diagram of a known double stage high voltage generator.

If the high voltage generator 50 is formed by n stages and the first potential $V_1$ is the same as the second potential $V_2$, the output voltage $V_O$ is equal to:

$$V_O = (n+1)V_1 - 2nV_D$$

where $V_D$ is the voltage present across each diode.

Figure 3:
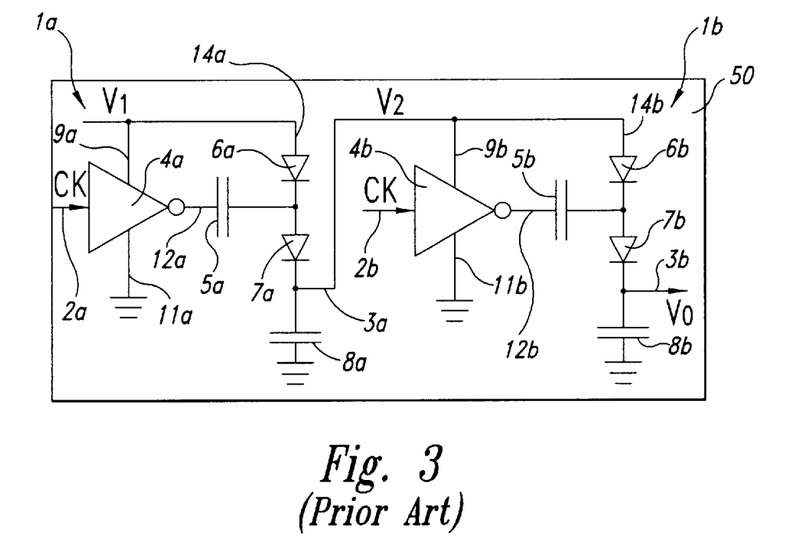
FIG. 3 shows a second embodiment of the double stage high voltage generator in FIG. 2.

As it possesses a silicon technology that is able to support high voltages, the high voltage generator 50 may be advantageously realized as shown in FIG. 3 in which each stage $1_a$, $1_b$ has the anode terminal $14_a$, $14_b$ of the corresponding first diode $6_a$, $6^b$ and the first terminal $9_a$, $9_b$ of the corresponding buffer $4_a$, $4_b$ set at the same reference potential.

In this case the output voltage $V_O$ is equal to:

$$V_O = 2^n V_1 + (2 - 2^{n+1})V_D$$

However, the high voltage generators of the prior art are poorly efficient when they are supplied with voltages of a few Volts (for example 1.8V) which are imposed by the use of more and more advanced submicrometric technologies.

BRIEF SUMMARY OF THE INVENTION

The aim of the present invention is to provide a capacitive high voltage generator having greater efficiency than that which may be obtained with capacitive high voltage generators of the prior art and able to supply high output voltages even when starting from initial voltages of only a few Volts.

In one embodiment, the invention resides in a capacitive high voltage generator operable in response to input timing signals and connectable to first and second supply inputs and a reference potential. The generator includes first, second and third charging circuits. Each charging circuit has a control element, a switch element and a boost capacitor. The control element of the first and second charging circuits are configured to alternatively connect the boost capacitor thereof to the first supply input and to the reference potential in response to one of the input timing signals. The switch element is connected to the boost capacitor of each charging circuit with the junction thereof forming an output terminal of the charging circuit. The switch element of the first and second charging circuits is connected to the second supply input. The control element of the third charging circuit is configured to alternatively connect the boost capacitor thereof to the output terminal of the first charging circuit and to the reference potential in response to one of the input timing signals. The switch element of the third charging circuit is connected to the output terminal of the second charging circuit. The output of the third charging circuit is the output of the combination of the first, second and third charging circuits.

In this embodiment, the switch element of each of the first, second and third charging circuits may be a diode. Alternatively, the switch element of each of the first, second and third charging circuits may be a MOS transistor. Or, the switch element of the first, second and third charging circuits may perform a synchronous rectification. The control element of each of the first, second and third charging circuits may be an inverting buffer.

In one illustrated embodiment, each of the first, second and third charging circuits is configured for connection to first and second supply inputs and a reference potential. Each charging circuit includes a buffer element, a switch element and a boost capacitor. The boost capacitor has first and second terminals. The switch element has first and second terminals. The buffer element has a timing input to receive the input timing signal or the negative thereof, a first terminal, a second terminal connected to the reference potential, and an output connected to the first terminal of the boost capacitor. The charging circuit is configured to alternatively connect the first terminal of the boost capacitor to the first supply input and to the reference potential in response to the input timing signal. The second terminal of the switch element is connected to the second terminal of the boost capacitor with the junction thereof forming an output terminal of the charging circuit. The first terminal of the buffer element of the first and second charging circuits is connected to the first supply input. The first terminal of the switch elements of the first and second charging circuits is connected to the second supply input. The first terminal of the buffer element of the third charging circuit is connected to the output terminal of the first charging circuit. The first terminal of the switch element of the third charging circuit is connected to the output terminal of the second charging circuit. The output terminal of the third charging circuit is configured as the output of the combination of the first, second and third charging circuits.

Other features and advantages of the invention will become apparent from the following detailed description, taken in conjunction with the accompanying drawings.

According to the present invention a capacitive high voltage generator is provided.

BRIEF DESCRIPTION OF THE SEVERAL VIEWS OF THE DRAWING(S)

For a better understanding of the invention, an embodiment is now described, purely as an example without limitation, with reference to the enclosed drawings, in which.

DETAILED DESCRIPTION OF THE INVENTION

Figure 4:
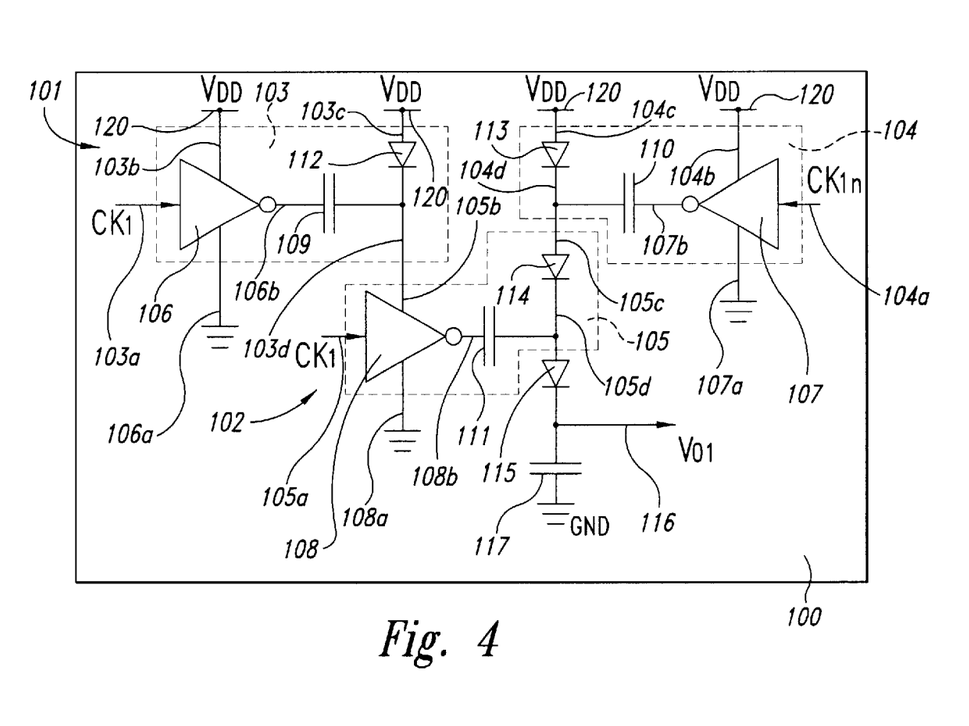
FIG. 4 shows a circuit diagram of a double stage high voltage generator realized according to the invention.

FIG. 4 shows a high voltage generator 100 comprising a first stage 101 and a second stage 102. The first stage 101 is formed by a first basic block and a second basic block 103, 104 and the second stage 102 is formed by a third basic block 105.

In detail, each basic block 103, 104, 105 has a timing input 103a, 104a, 105a, a first and a second supply input, respectively, 103b, 104b, 105b, and 103c, 104c, 105c, both connected to a supply line 120 set at a reference potential $V_{DD}$, and an output terminal 103d, 104d, 105d. In particular, the timing inputs 103a, 105a of the first and of the third basic block 103, 105 receive a timing signal CK1 while the timing input 104a of the second basic block 104 receives the negated timing signal CK1n. Moreover, the output terminal 103d of the first basic block 103 and the output terminal 104d of the second basic block 104 are connected, respectively, to the first and to the second supply input 105b and 105c of the third basic block 105.

As indicated in FIG. 4, each basic block 103, 104, 105 comprises: an inverting buffer 106, 107, 108 having a first terminal connected to the first supply input 103b, 104b, 105b of the corresponding basic block 103, 104, 105, a second terminal 106a, 107a, 108a connected to a ground terminal GND, and an input terminal connected to the timing input 103a, 104a, 105a of the corresponding basic block 103, 104, 105; a boost capacitor 109, 110, 111 having a first terminal connected to an output terminal 106b, 107b, 108b of the corresponding buffer 106, 107, 108, and a second terminal connected, in a non-disconnectable way, to the output terminal 103d, 104d, 105d of the corresponding basic block 103, 104, 105; a diode 112, 113, 114 having an anode terminal and a cathode terminal between which is present a voltage $V_{D1}$; the anode terminal is connected to the second supply input 103c, 104c, 105c of the corresponding basic block 103, 104, 105 and the cathode terminal is connected, in a non-disconnectable way, to the output 103d, 104d, 105d of the corresponding basic block 103, 104, 105.

Moreover, with the same power supplied, the dimensions of the buffer 106 of the first basic block 103 and the dimensions of the buffer 107 of the second basic block 104 are equal to half the dimensions of the buffer 4, $4_a$ of the first stage $1_a$ of the known voltage generator 50 of FIGS. 2 and 3. In fact, while the buffer 4, 4a of the first stage $1_a$ of the known voltage generator 50 must supply all the power necessary for the operation of the second stage $1_b$ of the same generator, in the high voltage generator 100 according to the present invention, the buffer 106 of the first basic block 103 and the buffer 107 of the second basic block 104 operate 180° out of phase from each other, alternatively transferring energy to the third basic block 105. For this reason their dimensions can be halved. However, the total dimensions of the high voltage generator 100 remain unvaried with respect to those of the high voltage generator 50 because two buffers are necessary instead of one.

The high voltage generator 100 also comprises an output diode 115 connected between the output terminal 105d of the third basic block 105 and an output terminal 116 of the high voltage generator 100 on which is present an output voltage $V_{O1}$. Moreover, the high voltage generator 100 comprises a filter capacitor 117 connected between the output terminal 116 and the ground terminal GND.

The operation of the high voltage generator 100 is as follows.

Initially, in a first phase, the timing signal CK1 and the negated timing signal CK1n are respectively at a high logic level and at a low logic level. Consequently, the buffer 106 of the first basic block 103 generates a low logic signal on its own output terminal 106b, while the buffer 107 of the second basic block 104 generates a high logic signal on its own output terminal 107b. In these conditions, in the diode 112 of the first basic block 103 there flows a current which charges the boost capacitor 109 of the first basic block 103 at a voltage of $V_{DD}-V_{D1}$ and therefore equal to the value of the reference potential $V_{DD}$ minus the voltage drop $V_{D1}$ across the diode 112 (charging phase of the first basic block 103). No current flows in the diode 113 of the second basic block 104. The voltage $V_{DD}-V_{D1}$ present on the output terminal 103d of the first basic block 103 is supplied to the first supply input 105b of the third basic block 105 and therefore constitutes the supply voltage of the buffer 108 of the third basic block 105.

Subsequently, in a second phase, the timing signal CK1 switches to a low logic level, hence the negated timing signal CK1n switches to a high logic level. Consequently, the buffer 106 of the first basic block 103 generates a high logic signal on its own output terminal 106b, equal to the reference potential $V_{DD}$. In these conditions, on the output terminal 103d of the first basic block 103 there is a voltage of 2 $V_{DD}-V_{D1}$ (boosting phase of the first basic block 103) while no current flows in the diode 112. Moreover, the buffer 107 of the second basic block 104 generates a low logic signal on its own output terminal 107b. In these conditions, in the diode 113 of the second basic block 104 there flows a current which charges the boost capacitor 110 at a voltage of $V_{DD}-V_{D1}$ and therefore equal to the reference potential $V_{DD}$ minus the voltage drop across the diode 113 (charging phase of the second basic block 104). The voltage present on the output terminal 104d of the second basic block 104 is supplied to the second supply input 105c of the third basic block 105.

When, in a third phase, the timing signal CK1 switches back to a high logic level, the first basic block 103 acts as describe above with respect to the first phase (charging phase of the first basic block 103). Moreover, the buffer 107 of the second basic block 104 generates a high logic signal on its own output terminal 107b; consequently, on the output terminal 104d of the second basic block 104 there is a voltage of +$2V_{DD}-V_{D1}$ and therefore equal to double the reference potential $V_{DD}$ minus the voltage drop across the diode 113 (boosting phase of the second basic block 104).

Moreover, the buffer 108 of the third basic block 105 generates a low logic signal on its own output terminal 108b. In these conditions, in the diode 114 of the third basic block 105 there flows a current which charges the boost capacitor 111 at a voltage of $2V_{DD}-2V_{D1}$ and therefore equal to the voltage present on the output terminal 104d of the second basic block 104 minus the voltage drop across the diode 114 (charging phase of the third basic block 105).

Subsequently, in a fourth phase, when the timing signal CK1 switches back to a low logic level, the first basic block 103 acts as described above with respect to the second phase (boosting phase of the first basic block 103) and therefore supplies a voltage of $2V_{DD}-V_{D1}$ to the first supply input 105b of the third basic block 105. The second basic block 104 acts as described above with respect to the second phase (charging phase of the second basic block 104) and therefore supplies a voltage of $V_{DD}-V_{D1}$ to the second supply input 105c of the third basic block 105. Moreover, the output terminal 105d of the third basic block 105 goes to the voltage $4V_{DD}-3V_{D1}$. The third basic block 105 then transfers the charge stored in its own boost capacitor 111 and the charge supplied by the first basic block 103 to the output terminal 116 of the high voltage generator 100 through the output diode 115.

The circuit configuration shown in FIG. 4 may be extended to a number n of stages.

Figure 5:
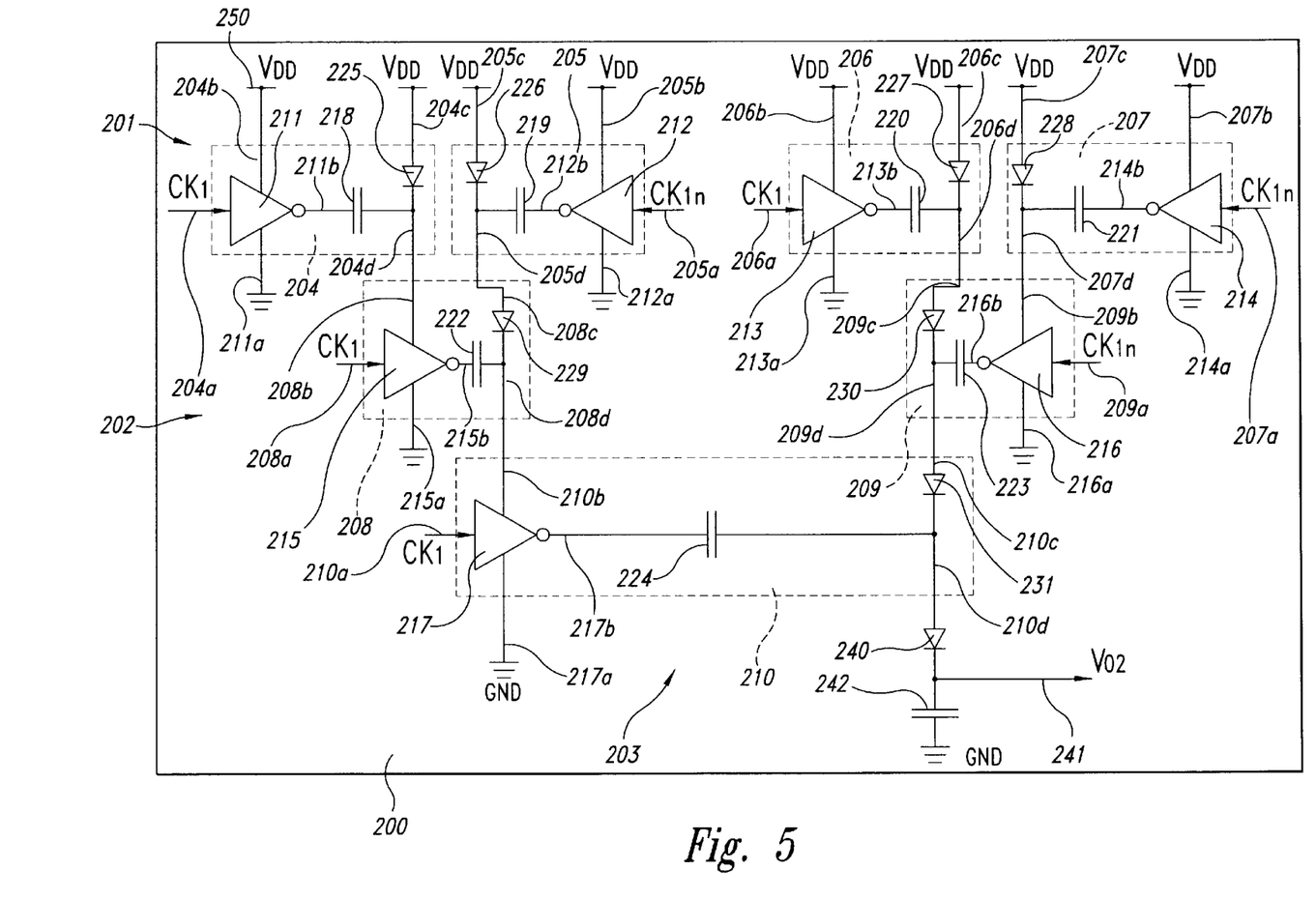
FIG. 5 shows a circuit diagram of a three stage high voltage generator.

On this matter, FIG. 5 shows a high voltage generator 200 including a first, a second and a third stage 201–203. The first stage 201 is formed by a first, a second, a third and a fourth basic block 204–207; the second stage 202 is formed by a fifth and a sixth basic block 208 and 209; the third stage 203 is formed by a seventh basic block 210. Each basic block 204–210 has a timing input 204a–210a, a first and a second supply input, 204b–210b and 204c–210c respectively, all connected to a supply line 250 set at the reference potential $V_{DD}$, and an output terminal 204d–210d. In particular, the timing inputs 204a, 206a, 208a, 210a of the first, the third, the fifth and the seventh basic block 204, 206, 208, 210 receive the timing signal CK1 while the timing inputs 205a, 207a, 209a of the second, the fourth and the sixth basic block 205, 207, 209 receive the negated timing signal CK1n.

Moreover, the output terminal 204d of the first basic block 204 and the output terminal 205d of the second basic block 205 are respectively connected to the first and to the second supply input 208b and 208c of the fifth basic block 208; the output terminal 206d of the third basic block 206 and the output terminal 207d of the fourth basic block 207 are respectively connected to the second and to the first supply input 209c and 209b of the sixth basic block 209; the output terminal 208d of the fifth basic block 208 and the output terminal 209d of the sixth basic block 209 are respectively connected to the first and to the second supply input 210b and 210c of the seventh basic block 210.

As indicated in FIG. 5, each basic block 204–210 comprises an inverting buffer 211–217 having a first terminal connected to the first supply input 204b–210b of the corresponding basic block 204–210, a second terminal 211a–217a connected to a ground terminal GND and an input terminal connected to the timing input 204a–210a of the corresponding basic block 204–210; a boost capacitor 218–224 having a first terminal connected to the output terminal 211b–217b of the corresponding buffer 211–217 and a second terminal connected, in a non-disconnectable way, to the output 204d–210d of the corresponding basic block 204–210; a diode 225–231 having an anode terminal and a cathode terminal, the anode terminals of diodes 225–228 being connected to supply line 250 on which is present the voltage $V_{DD}$; the anode terminal of each diode is connected to the second supply input 204c–210c of the corresponding basic block 204–210 and the cathode terminal is connected, in a non-disconnectable way, to the output terminal 204d–210d of the corresponding basic block 204–210.

In this case, with the same power supplied, the dimensions of each buffer 211, 212, 213, 214 of the first stage 201 are equal to about a quarter of the dimensions of the buffer 4, $4_a$ comprised in the first stage $1_a$ of the known voltage generator 50 shown in FIGS. 2 and 3.

The high voltage generator 200 further comprises an output diode 240 connected between the output terminal 210d of the seventh basic block 210 and an output terminal 241 of the high voltage generator 200 on which is present an output voltage $V_{O2}$. Moreover the high voltage generator 200 comprises a filter capacitor 242 connected between the output terminal 241 of the high voltage generator 200 and the ground terminal GND.

The operation of the voltage generator 200 is identical to that of the high voltage generator 100 of FIG. 4. In this case, however, having an extra stage, the output voltage $V_{O2}$ is higher than the output voltage $V_{O1}$.

The total number of stages which form the high voltage generators 100, 200 depends on the voltage value which must be supplied at the output. Moreover, comparing the structure of the high voltage generator 100 shown in FIG. 4 with the structure of the high voltage generator 200 shown in FIG. 5, it may be seen how, proceeding towards the first stage, the number of stages grows, doubling at each level. Moreover, as the supply voltage of the single stages increases, the buffers, the boost capacitors and the diodes that form the individual basic blocks must be realized in such a way as to support gradually higher voltages, passing from the first to the last stage.

The high voltage generator according to the invention presents the following advantages.

Firstly, the high voltage generator according to the invention has a greater efficiency than the known high voltage generators due to the smaller number of diodes used to realize them. This results in a higher output voltage. In fact, the output voltage generated by each basic block of the voltage generator according to the invention is 0.7 V higher than the output voltage generated by each stage of the known high voltage generator. This is decisive above all when the starting voltage is only a few Volts.

Moreover, the high voltage generator according to the invention has a lower number of filter capacitors (out of n stages, n–1 filter capacitors have been eliminated). Since the filter capacitors are often outside the generator, their elimination also allows the elimination of the pads associated with them and the respective connections. Moreover, if the filter capacitors are inside the generator, their elimination allows a considerable reduction of the dimensions of the generator itself.

Figure 6:
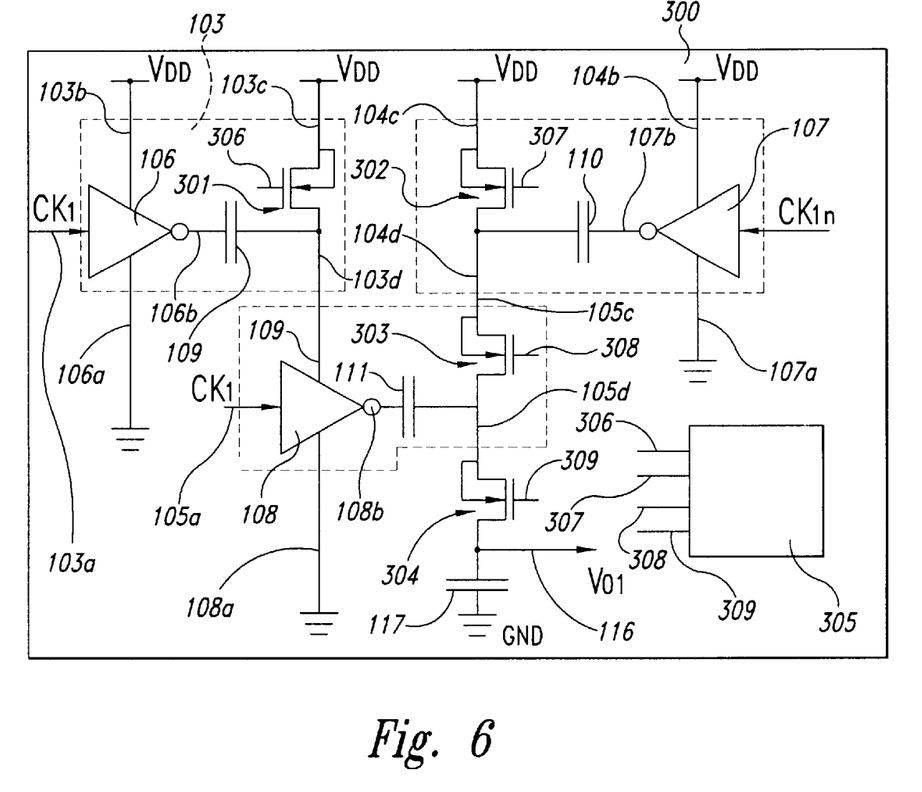
FIG. 6 shows a second embodiment of the double stage high voltage generator in FIG. 4.

Moreover, the diodes may be replaced (all or only some of them) by other switch elements, in particular by a transistor which performs a synchronous rectification. For example, FIG. 6 shows a high voltage generator 300 quite similar to the high voltage generator 100 shown in FIG. 4, except for the fact that the diode 112 of the basic block 103, the diode 113 of the basic block 104 and the diode 114 of the basic block 105 have each been replaced by an N-channel MOS transistor 301, 302, 303, while the output diode 115 has been replaced also by an N-channel MOS output transistor 304. Each MOS transistor 301, 302, 303 has a source terminal connected to the second supply input 103c, 104c, 105c of the corresponding basic block 103, 104, 105, a drain terminal connected to the output terminal 103d, 104d, 105d of the corresponding basic block 103, 104, 105 and a gate terminal 306, 307, 308 connected to a drive circuit 305 outside the high voltage generator 300 and shown only schematically in FIG. 6. The output transistor 304 has a source terminal connected to the output terminal 105d of the third basic block 105, a drain terminal connected to the output terminal 116 of the high voltage generator 300 and a gate terminal 309 connected to the drive circuit 305.

Alternatively, each MOS transistor 301, 302, 303 of the basic blocks 103, 104, 105 and the MOS output transistor 304 may be of P-channel type. In this case the MOS transistors 301, 302, 303 have a drain terminal connected to the second supply input 103c, 104c, 105c of the corresponding basic block 103, 104, 105 and a source terminal connected to the output terminal 103d, 104d, 105d of the corresponding basic block 103, 104, 105, while the MOS output transistor 304 has a drain terminal connected to the output terminal 105d of the third basic block 105 and a source terminal connected to the output terminal 116 of the high voltage generator 300.

From the foregoing it will be appreciated that, although specific embodiments of the invention have been described herein for purposes of illustration, various modifications may be made without deviating from the spirit and scope of the invention. Accordingly, the invention is not limited except as by the appended claims.

What is claimed is:

1. A capacitive high voltage generator comprising at least a first basic block, comprising:
    a timing input;
    a first supply input and a second supply input;
    a reference potential line;
    an output terminal;
    a capacitive element having a first terminal and a second terminal, said first terminal being connected alternatively to said first supply input and to said reference potential line; and
    a switch element having a first terminal connected to the second supply input and a second terminal, said second terminal of said capacitive element and said second terminal of said switch element being connected to said output terminal in a non-disconnectable way.

2. A capacitive high voltage generator comprising:
    first and second hierarchically lower blocks and a hierarchically higher block, said first and second hierarchically lower blocks and said hierarchically higher block each comprising:
        a timing input;
        a first supply input and a second supply input;
        a reference potential line;
        an output terminal;
        a capacitive element having a first terminal and a second terminal, said first terminal being connected alternatively to said first supply input and to said reference potential line; and
        a switch element having a first terminal connected to the second supply input and a second terminal, said second terminal of said capacitive element and said second terminal of said switch element being connected to said output terminal in a non-disconnectable way.

3. The generator according to claim 2, wherein said output terminal of said first hierarchically lower block is connected to said first supply input of said hierarchically higher block and said output terminal of said second hierarchically lower block is connected to said second supply input of said hierarchically higher block.

4. The generator according to claim 3, wherein said output terminal of said hierarchically higher block is coupled to an output terminal of said generator.

5. The generator according to claim 3, wherein the timing inputs of said first hierarchically lower block and of said hierarchically higher block each receive a first timing signal, and said timing input of said second hierarchically lower block receives a second timing signal in phase opposition to said first timing signal.

6. The generator according to claim 4, wherein the timing inputs of said first hierarchically lower blocks and of said hierarchically higher block each receive a first timing signal, and said timing input of said second hierarchically lower block receives a second timing signal in phase opposition to said first timing signal.

7. The generator according to claim 2, wherein said first and second hierarchically lower blocks and said hierarchically higher block each form a basic block, with each said basic block comprising a buffer element having a first terminal connected to said first supply input of a corresponding basic block, a second terminal connected to said reference potential line and an input terminal connected to said timing input of a corresponding basic block.

8. The generator according to claim 5, wherein said first and second hierarchically lower blocks and said hierarchically higher block each form a basic block, with each said basic block comprising a buffer element having a first terminal connected to said first supply input of a corresponding basic block, a second terminal connected to said reference potential line and an input terminal connected to said timing input of a corresponding basic block.

9. The generator according to claim 8, wherein said switch element is a diode.

10. The generator according to claim 9, wherein said diode has an anode terminal connected to said second supply input of a corresponding basic block and a cathode terminal connected to said output terminal of a corresponding basic block.

11. The generator according to claim 2, wherein said switch element is a MOS transistor.

12. The generator according to claim 11, wherein said MOS transistor has a first terminal connected to said second supply input of a corresponding basic block, a second terminal connected to said output terminal of a corresponding basic block and a control terminal connected to a drive circuit.

13. The generator according to claim 2, wherein said capacitive element is a capacitor.

14. A capacitive high voltage generator operable in response to an input timing signal, comprising:
    first, second and third charging circuits, each charging circuit being configured for connection to first and second supply inputs and a reference potential, each charging circuit including a buffer element, a switch element and a boost capacitor, the boost capacitor having first and second terminals, the switch element having first and second terminals, the buffer element having a timing input to receive the input timing signal or the negative thereof, a first terminal, a second terminal connected to the reference potential, and an output connected to the first terminal of the boost capacitor, the charging circuit being configured to alternatively connect the first terminal of the boost capacitor to the first supply input and to the reference potential in response to the input timing signal, and the second terminal of the switch element being connected to the second terminal of the boost capacitor with the junction thereof forming an output terminal of the charging circuit; the first terminal of the buffer element of the first and second charging circuits being connected to the first supply input, the first terminal of the switch elements of the first and second charging circuits being connected to the second supply input, the first terminal of the buffer element of the third charging circuit being connected to the output terminal of the first charging circuit, and the first terminal of the switch element of the third charging circuit being connected to the output terminal of the second charging circuit, the output terminal of the third charging circuit configured as the output of the combination of the first, second and third charging circuits.

15. The generator according to claim 14, wherein the switch element of each of the first, second and third charging circuits is a diode.

16. The generator according to claim 14, wherein the switch element of each of the first, second and third charging circuits is a MOS transistor.

17. The generator according to claim 14, wherein the switch element of the first, second and third charging circuits performs a synchronous rectification.

18. The generator according to claim 14, wherein the buffer element of each of the first, second and third charging circuits is an inverting buffer.

19. A capacitive high voltage generator operable in response to input timing signals and connectable to first and second supply inputs and a reference potential, comprising:

first, second and third charging circuits, each charging circuit including a control element, a switch element and a boost capacitor, the control element of the first and second charging circuits being configured to alternatively connect the boost capacitor thereof to the first supply input and to the reference potential in response to one of the input timing signals, the switch element being connected to the boost capacitor of each charging circuit with the junction thereof forming an output terminal of the charging circuit, the switch element of the first and second charging circuits being connected to the second supply input, the control element of the third charging circuit being configured to alternatively connect the boost capacitor thereof to the output terminal of the first charging circuit and to the reference potential in response to one of the input timing signals, and the switch element of the third charging circuit being connected to the output terminal of the second charging circuit, the output of the third charging circuit being the output of the combination of the first, second and third charging circuits.

20. The generator according to claim 19, wherein the switch element of each of the first, second and third charging circuits is a diode.

21. The generator according to claim 19, wherein the switch element of each of the first, second and third charging circuits is a MOS transistor.

22. The generator according to claim 19, wherein the switch element of the first, second and third charging circuits performs a synchronous rectification.

23. The generator according to claim 19, wherein the control element of each of the first, second and third charging circuits is an inverting buffer.

24. A capacitive high voltage generator operable in response to input timing signals and connectable to first and second supply inputs and a reference potential, comprising:

first, second and third charging blocks, the first and second charging blocks each including first, second and third charging circuits, each charging circuit including a control element, a switch element and a boost capacitor, the control element of the first and second charging circuits being configured to alternatively connect the boost capacitor thereof to the first supply input and to the reference potential in response to one of the input timing signals, the switch element being connected to the boost capacitor of each charging circuit with the junction thereof forming an output terminal of the charging circuit, the switch element of the first and second charging circuits being connected to the second supply input, the control element of the third charging circuit being configured to alternatively connect the boost capacitor thereof to the output terminal of the first charging circuit and to the reference potential in response to one of the input timing signals, and the switch element of the third charging circuit being connected to the output terminal of the second charging circuit, the output of the third charging circuit being the output of the corresponding first and second charging block; and the third charging block including a charging circuits having a control element, a switch element and a boost capacitor, the switch element being connected to the boost capacitor of the charging circuit of the third charging block with the junction thereof forming an output terminal of the charging circuit of the third charging block, the control element of the third charging block being configured to alternatively connect the boost capacitor thereof to the output terminal of the first charging block and to the reference potential in response to one of the input timing signals, and the switch element of the charging circuit of the third charging block being connected to the output terminal of the second charging block, the output of the third charging block being the output of the combination of the first, second and third charging blocks.

25. A voltage boost circuit comprising:

a buffer circuit having an input terminal and an output terminal;

a clock input coupled to the input terminal of the buffer circuit;

a capacitor having a first terminal and second terminal, the first terminal being coupled to the output terminal of the buffer circuit;

a first voltage supply potential input and a second voltage supply potential input at a different potential value via the buffer circuit than the first voltage supply, the first terminal of the capacitor being alternatively connectable to either the first voltage supply potential value or the second voltage supply potential value and the second terminal of the capacitor being connected to an output node of the voltage boost circuit in a non-disconnectable way to provide a first boosted voltage potential supply.

26. The circuit according to claim 25 further including:

a second voltage boost circuit coupled at its input to the output node of the second terminal of the capacitor, its input being the voltage supply input for the second voltage boost circuit;

a buffer circuit whose output is alternatively switchable between the output node having boosted first voltage potential and the second voltage supply potential;

and, a capacitor having its first terminal coupled to the output of the second buffer circuit and a second terminal coupled to a second output terminal so as to provide a further boosted voltage on the second output terminal.

* * * * *

UNITED STATES PATENT AND TRADEMARK OFFICE
CERTIFICATE OF CORRECTION

PATENT NO.     : 6,631,081 B2
DATED          : October 7, 2003
INVENTOR(S)    : Luca Fontanella It is certified that error appears in the above-identified patent and that said Letters Patent is hereby corrected as shown below:

<u>Title page,</u>
Item [73], the Assignee should read as -- STMicroelectronics S.r.l., Agrate Brianza (IT) --.
Item [74], the *Attorney, Agent or Firm*, should read as -- Lisa K. Jorgenson; David V. Carlson; Seed IP Law Group PLLC --.

Signed and Sealed this

Tenth Day of February, 2004

JON W. DUDAS
*Acting Director of the United States Patent and Trademark Office*